(12) United States Patent
Ugolini

(10) Patent No.: US 6,325,441 B1
(45) Date of Patent: Dec. 4, 2001

(54) COVERING STRUCTURE FOR A TWO-WHEELER VEHICLE

(75) Inventor: Roberto Ugolini, Rimini (IT)

(73) Assignee: Benelli S.p.A., Pesaro (IT)

( * ) Notice: Subject to any disclaimer, the term of this patent is extended or adjusted under 35 U.S.C. 154(b) by 0 days.

(21) Appl. No.: 09/661,515

(22) Filed: Sep. 13, 2000

(30) Foreign Application Priority Data

Sep. 14, 1999 (IT) ................................ 99A000785

(51) Int. Cl.[7] .................................................. B62J 17/00
(52) U.S. Cl. ..................... 296/78.1; 296/108; 296/107.08
(58) Field of Search .................... 296/78.1, 108, 296/107.08

(56) References Cited

U.S. PATENT DOCUMENTS

| | | | |
|---|---|---|---|
| 3,979,147 | * | 9/1976 | Kelley ................................. 296/78.1 |
| 4,372,602 | * | 2/1983 | Tsuchiya et al. ................... 296/78.1 |
| 4,632,448 | * | 12/1986 | Yagasaki et al. ................... 296/78.1 |
| 4,778,214 | * | 10/1988 | Fu ....................................... 296/78.1 |
| 4,973,082 | * | 11/1990 | Kincheloe .......................... 296/78.1 |
| 5,072,987 | * | 12/1991 | Allen .................................. 296/78.1 |
| 5,445,200 | * | 8/1995 | Celestine et al. ................... 296/78.1 |
| 5,458,390 | * | 10/1995 | Gilbert ................................ 296/78.1 |
| 5,562,139 | * | 10/1996 | Cseri ................................... 296/78.1 |
| 5,662,372 | * | 9/1997 | Lubkeman .......................... 296/78.1 |
| 5,685,388 | * | 11/1997 | Bothwell et al. ................... 296/78.1 |
| 5,947,222 | * | 9/1999 | Yamaoka et al. .................. 296/78.1 |
| 6,017,076 | * | 1/2000 | Belisle . |

FOREIGN PATENT DOCUMENTS

| | | | |
|---|---|---|---|
| 3517967 | * | 11/1985 | (DE) ................................... 296/78.1 |
| 3542488 | * | 6/1987 | (DE) ................................... 296/78.1 |
| 2649064 | * | 6/1989 | (FR) ................................... 296/78.1 |
| 2-124388 | * | 5/1990 | (JP) .................................... 296/78.1 |

* cited by examiner

Primary Examiner—Joseph D. Pape
Assistant Examiner—Kiran B. Patel
(74) Attorney, Agent, or Firm—Levine & Mandelbaum

(57) ABSTRACT

A covering structure for a two-wheeler vehicle, in particular a scooter, said covering structure acting as a shield at least above the driver's place of scooter, and consisting at least of two elements folding up one on the other. According to the invention, said folding elements (7,8) are obtained each one in a monoblock.

9 Claims, 5 Drawing Sheets

COVERING STRUCTURE FOR A TWO-WHEELER VEHICLE

DESCRIPTION

The present invention relates to a covering structure for a two-wheeler vehicle, in particular a scooter, said covering structure acting as a shield at least above the driver's place of said scooter, and consists at least of two elements folding up one on the other.

From the document EP 0 891 920, whose teaching is fully incorporated herein, a two-wheeler vehicle is known, called scooter, i.e. having small diameter wheels, a bodywork in plastic material and a tubular frame. Additionally, unlike other standard scooters, said scooter described in the document EP 0 891 920 is equipped of an enwrapping structure, which forms a protecting shield above the driver and a likely passenger, said protecting shield being eventually integrated by doors with deflecting windows. This protecting shield is adjustable in order to let the user have variable protection degrees, as required.

In particular, this protecting shield has a folding roof, i.e. it can be folded up and placed in the scooter luggage compartment without stripping it off the bodywork, likewise as it happens for convertible cars.

However, a similar protecting shield containing bearing elements, which is normally obtained by means of a metal frame covered by plastic elements, has several drawbacks. In fact, since such a protecting shield is a structure rising above the driver, its mass will considerably shift the centre of gravity of the vehicle, causing quite dangerous unbalances while driving the vehicle. Moreover, the protecting shield, for the presence of the frame and of the plastic aesthetic covering plus a large number of articulations and hinges for folding up, requires many different parts to be fitted together when it is assembled; this entails high production costs due to both the number of parts required and assembly operation itself.

Furthermore, having to assemble many parts is to the detriment of the precision and quality of the protecting shield and will also reduce design flexibility.

It is the object of the present invention to solve the above drawbacks and provide a covering structure for a two-wheeler vehicle having a more efficient and improved realization with respect to existing solutions.

In this frame, it is the main object of the present invention to provide a covering structure for a two-wheeler vehicle, whose shield structure has a weight such not to jeopardize the vehicle drive.

A further object of the present invention is to provide a covering structure for a two-wheeler vehicle having a protecting shield, which requires a reduced number of elements to be assembled.

A further object of the present invention is to provide a covering structure for a two-wheeler vehicle having a protecting shield, which allows a higher manufacturing precision and design flexibility at the same time.

A further object of the present invention is to provide a covering structure for a two-wheeler vehicle having a protecting shield, which can be obtained at a lower cost.

In order to achieve such aims, it is the object of the present invention to provide a covering structure for a two-wheeler vehicle incorporating the features of the annexed claims, which form an integral part of the description herein.

Further objects, features and advantages of the present invention will become apparent from the following detailed description and annexed drawings, which are supplied by way of non limiting example, wherein.

Figure 1:
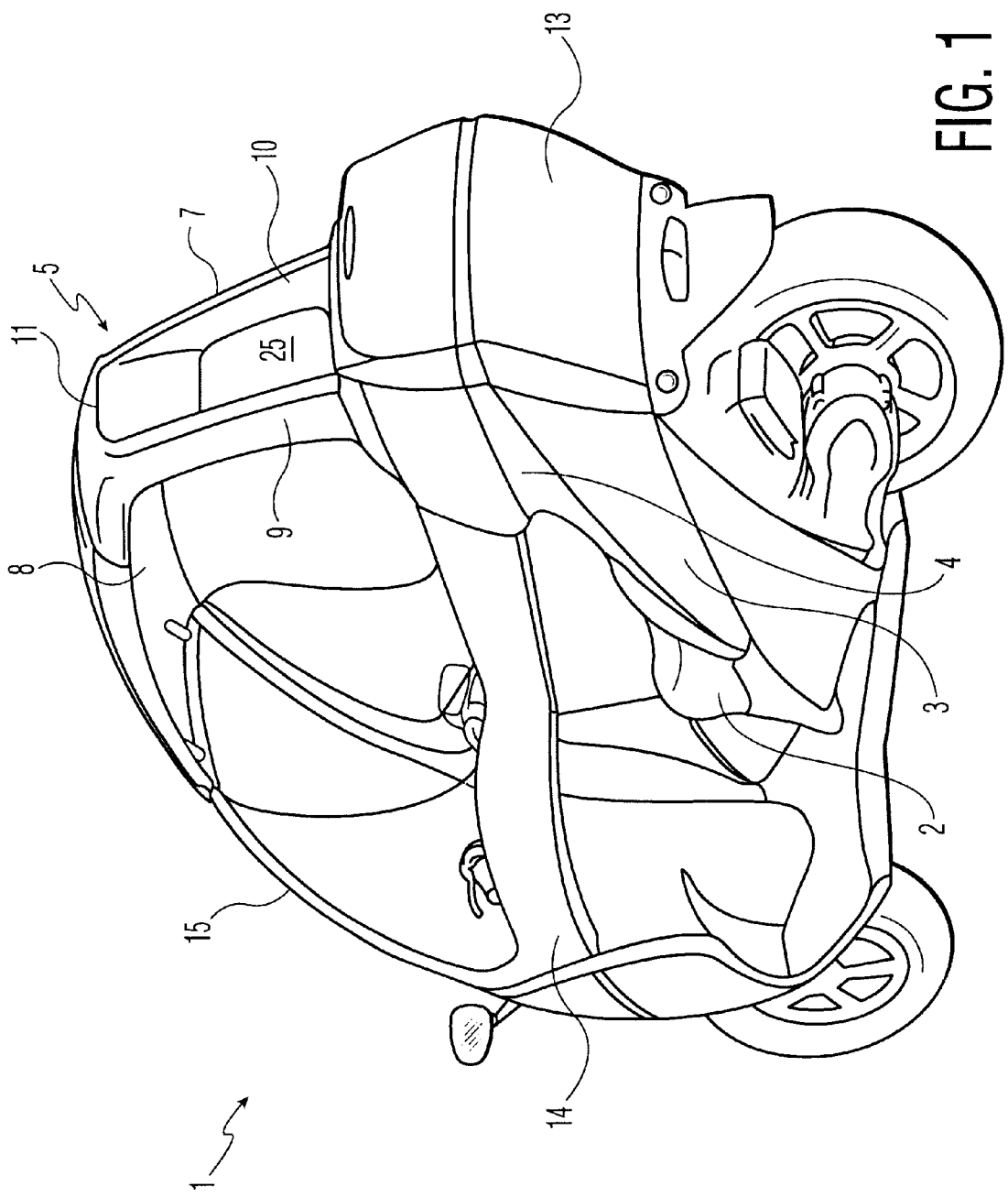
FIG. 1 shows a schematic view of a scooter with a covering structure for a two-wheeler vehicle, according to the invention.

In FIG. 1 is represented in a partial prospective view the rear side of a scooter 1, comprising a rear seat 2, which is contained inside a tail 3 forming the rear side of the scooter 1. Said tail 3 has aerodynamic profiles 4 sideways, whereas its upper section is associated to a folding shield 5. Said folding shield 5 consists of an upright element 7 connected to a small roof 8. The upright element 7 has substantially a "U" shape, with two arms 9 and 10 and a cross-bar 11, which delimit a rear window 25. Both arms 9 and 10 are hinged to the tail 3, whereas the cross-bar 11 is hinged to the small roof 8. Additionally, the tail 3 has a housing (12 of FIG. 2) with a removable lid 13. Said removable lid 13 is hinged to the lower section of the tail 3. Moreover, the scooter 1 has two side bulkheads 14, which are hinged to a front shield 15 of the scooter 1, and are used as a side guard or door for the driver.

Figure 2:
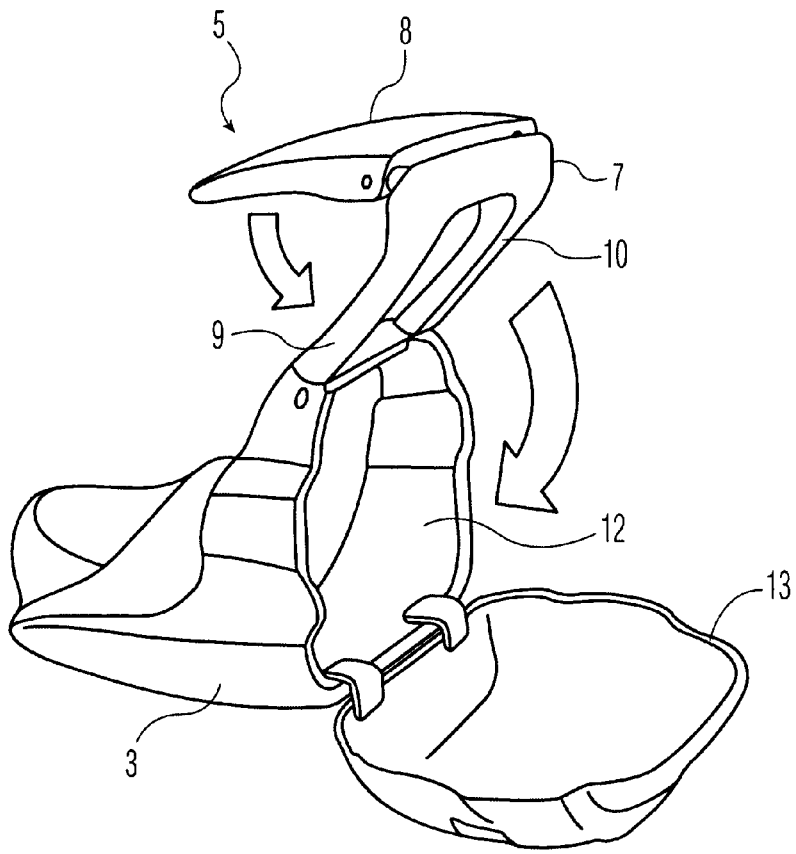
FIG. 2 shows a schematic view of a first operating stage of the covering structure for a two-wheeler vehicle, according to the invention.
Figure 3:
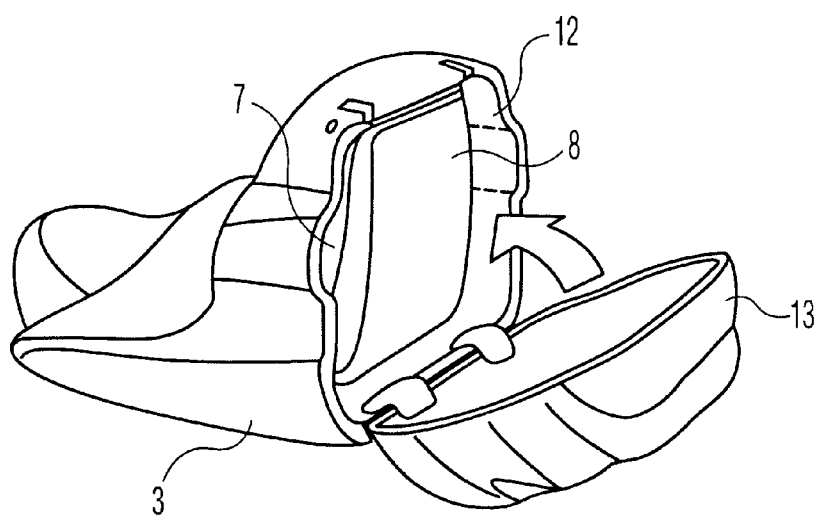
FIG. 3 shows a schematic view of a second operating stage of the covering structure for a two-wheeler vehicle, according to the invention.

As it can be seen in FIGS. 2 and 3, if the folding shield 5 is not in use, it is folded and placed inside the housing 12. In fact, the small roof 8 can be folded to bring it parallel to the upright element 7, while the arms 9 and 10 of said upright element 7 are hinged inside the housing 12, in manner that the folded shield 5, can be rotated until it is completely inside said housing 12, on which the removable lid 13 is then closed.

Figure 4:
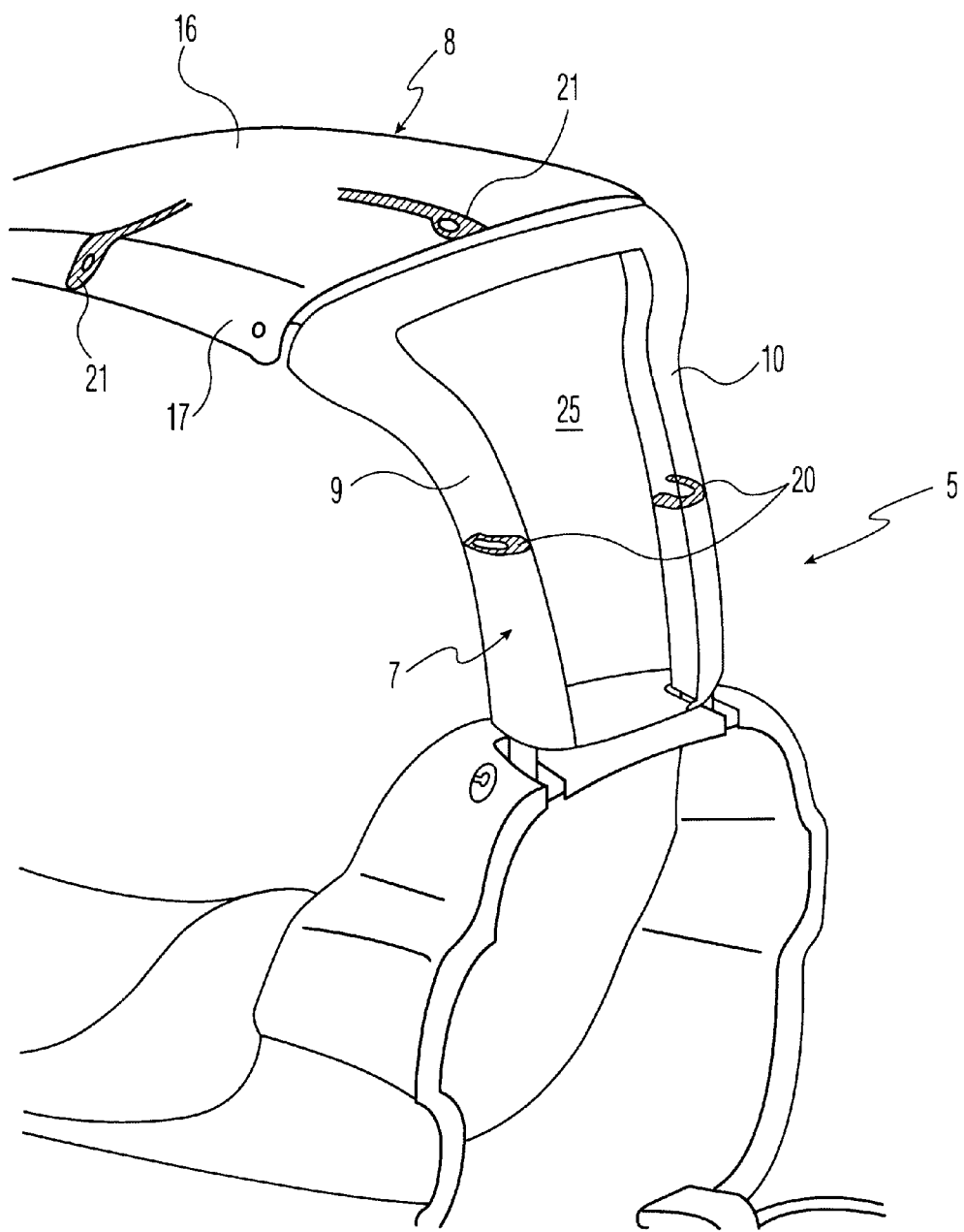
FIG. 4 shows a partial section of the covering structure for a two-wheeler vehicle, according to the invention.

In FIG. 4 is represented a partially sectioned detail of the folding shield 5. As said above, the folding shield 5 consists subtantially of two parts, i.e. the upright element 7 and the small roof 8. Said two parts, i.e. the upright element 7 and the small roof 8 are manufactured each one as a monoblock, which is obtained by thermoplastic gas injection moulding. Such a moulding technique allows the production of plastic parts with cavities, which therefore at one time are light and have a high structural rigidity. The plastic material used is Zytel™. In FIG. 4 is also showing a section 20 of the arms 9 and 10 of the upright element, identifying them as hollows. Similarly, FIG. 4 shows how the small roof 8 is obtained in a single piece by thermoplastic gas injection moulding, comprising a platform 16, which is solid and has peripheral ribs 17, identified by a hollow section 21.

Figure 5:
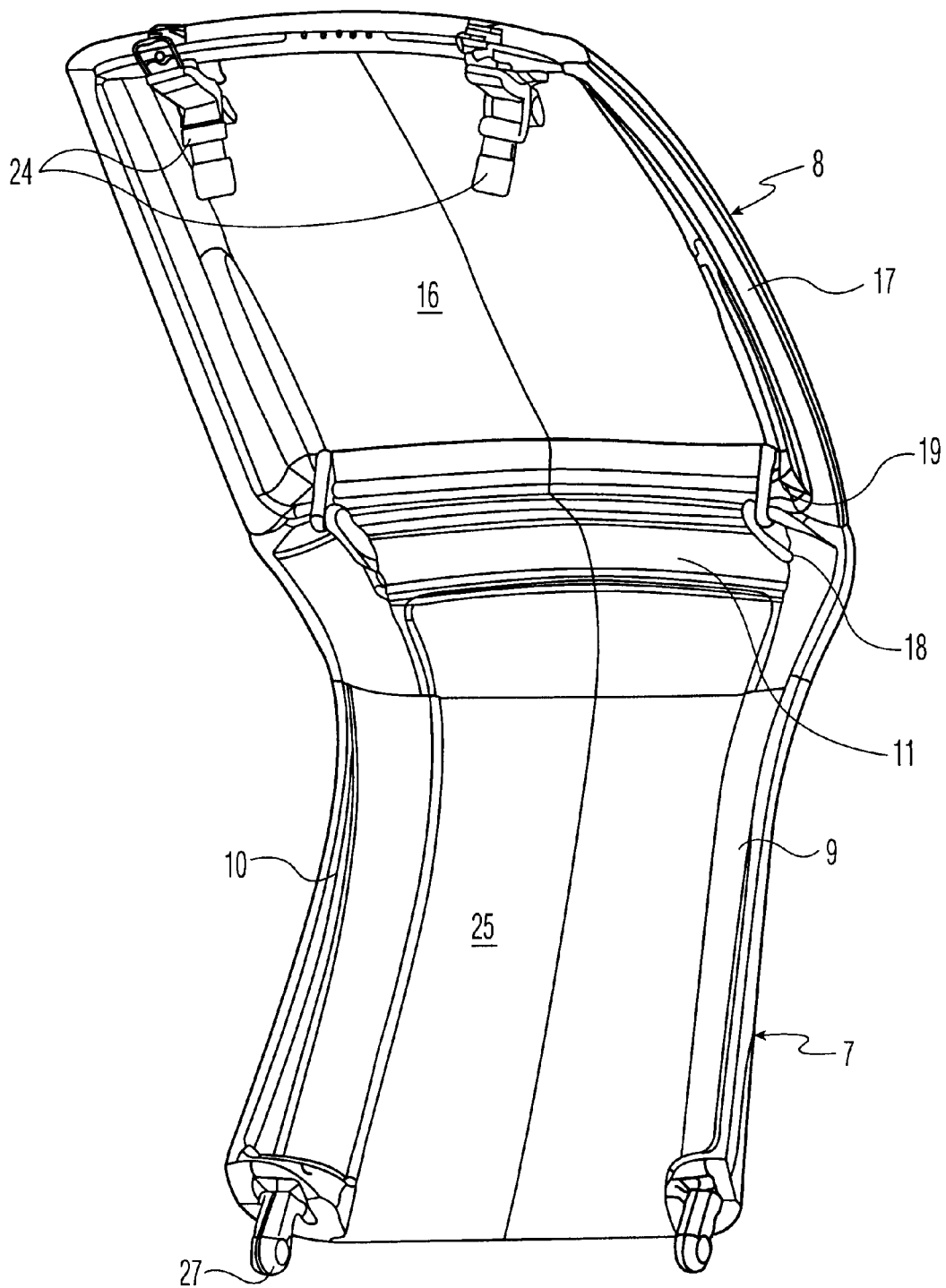
FIG. 5 shows a schematic view of the covering structure for a two-wheeler vehicle, according to the invention.

FIG. 5 is represented a further view of the folding shield 5, formed by the upright element 7 and the small roof 8. The upright element 7 has slots 27 on arms ends 8 and 9; these slots are apt to house some pins not shown here, which are comprised in the housing 12 for hinging the folding shield 5 to the scooter 1. Said slots 27 are also obtained as one-piece parts during moulding operation of the upright element 7. The upright element 7 also has further slots 18 in its upper section, which also pertain to the monoblock consisting of the upright element 7. Said slots 18 are apt to join together with pins 19 pertaining to the monoblock of the small roof 8, realizing the hinge that allows the folding shield 5 to fold up. FIG. 5 also shows some hooks 24 for engaging the small roof 8 to the front shield 15 of the scooter 1.

Figure 6:
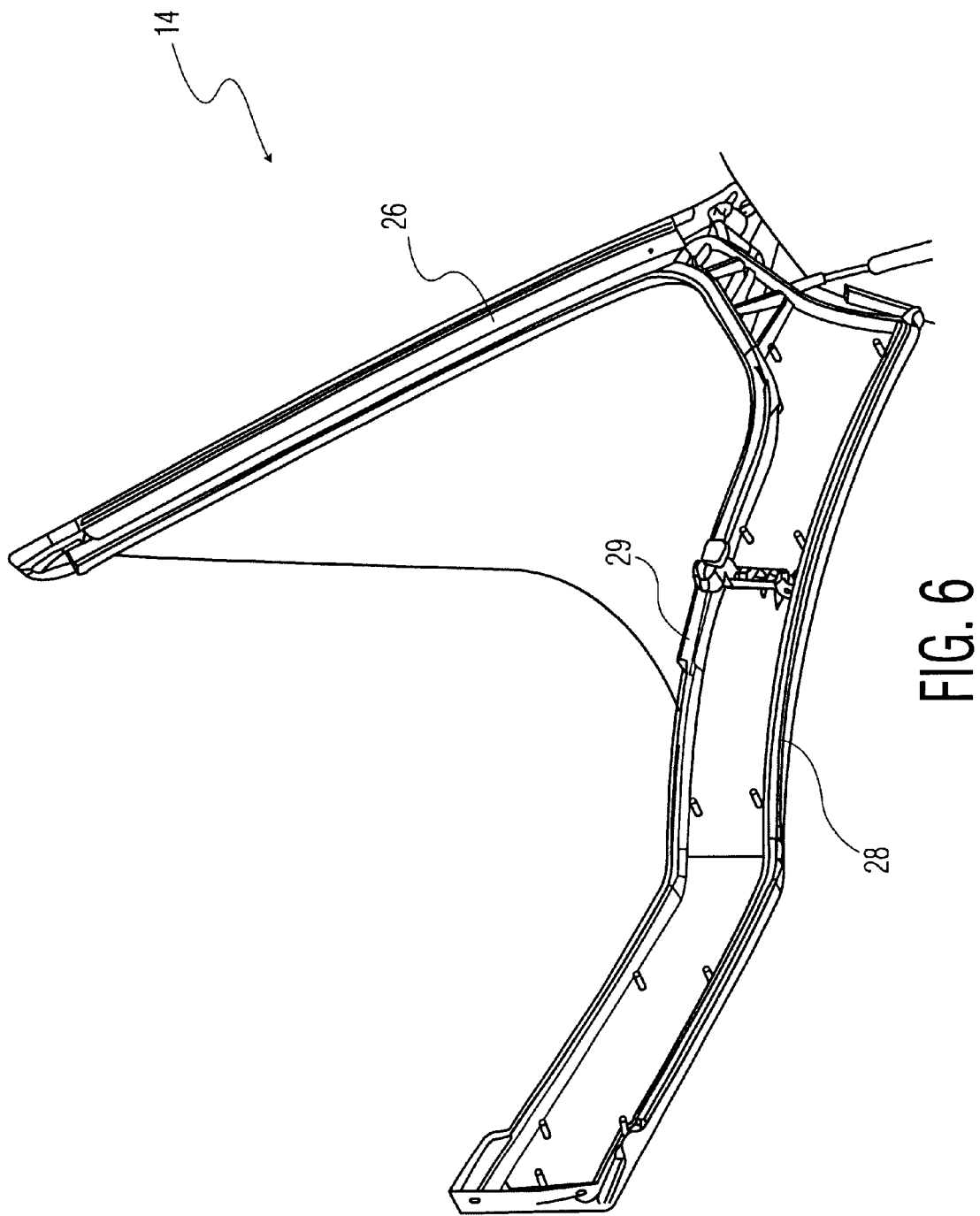
FIG. 6 shows a schematic view of a further detail of the covering structure for a two-wheeler vehicle, according to the invention.

In FIG. 6 is represented a detailed view of a side bulkhead 14, also made from a monoblock obtained by thermoplastic gas injection moulding. Said side bulkheads 14, in fact, comprises an upright 26, which has a hollow shape obtained by gas injection, whereas also the ribbings 29 and 28 are partially hollow.

From the above description the features of the present invention as well as the relevant advantages thereof are clear.

The covering structure for a two-wheeler vehicle according to the present invention has advantageously a highly reduced mass, being manufactured from monoblocks of plastic material, with cavities. Advantageously, this drastically decreases the unbalances caused by the covering itself. Moreover, the hollow plastic structure maintains the required sturdiness properties.

Moreover, the use of monoblocks for manufacturing of the elements of the covering structure according to the invention advantageously hallows to reduce the number of parts to be mounted during assembly; as a result, a faster assembly and lower manufacturing cost are obtained.

Moreover, moulding production of the whole covering structure allows a higher manufacturing precision and consequent improved quality.

Furthermore, the hinging system for folding the covering structure is advantageously moulded in the same monoblocks used for manufacturing the elements that form the covering structure.

Application of a thermoplastic direct injection moulding technique is particularly advantageous with respect to other manufacturing technologies for producing hollow elements from plastic material, such as blowing, since the elements forming the covering structure are not only hollow moulded, but also have variable thickness.

It is obvious that many changes are possible for the man skilled in the art to the covering structure for a two-wheeler vehicle and/or manufacturing method of a covering structure described above by way of example, without departing from the novelty spirit of the innovative idea, and it is also clear that in its practical actuation the components may be different in form and size from the ones described and be replaced with technical equivalent elements.

For instance, other plastic materials can be used for manufacturing the covering structure, provided they are suitable for thermoplastic moulding processes.

What is claimed is:

1. A covering structure for a two-wheeled vehicle having a compartment for a driver of the vehicle, said covering structure acting as a shield at least above said driver compartment, said covering structure including at least two elements folding up one on the other, each one of said folding elements consisting of a monoblock.

2. A covering structure for a two-wheeled vehicle, according to claim 1, wherein each one of said monoblocks comprises a hollow rib.

3. A covering structure for a two-wheeled vehicle, according to claim 2, wherein one of said monoblocks comprises an upright element and the other of said monoblocks comprises a roof.

4. A covering structure for a two-wheeled vehicle, according to claim 3, wherein the upright element comprises first hinging means operatively connectable to the scooter.

5. A covering structure for a two-wheeled vehicle, according to claim 3, wherein the upright element further comprises second hinging means and the roof comprises third hinging means which cooperatively interacts with the second hinging means.

6. A covering structure for a two-wheeled vehicle, according to claim 3, further including at least one side bulkhead comprising a monoblock.

7. A covering structure for a two-wheeled vehicle, according to claim 1, wherein said monoblocks are manufactured by thermoplastic gas injection molding.

8. A method of manufacturing a covering structure for a two-wheeled vehicle, comprising forming two monoblocks by thermoplastic gas injection molding, and providing means on each monoblock for folding up one on the other.

9. A two-wheeled vehicle comprising a covering structure acting as a shield at least above a driver compartment of said vehicle, said covering structure comprising at least two elements folding up one on the other, each of said folding elements consisting of a monoblock.

* * * * *